Patented Apr. 15, 1924.

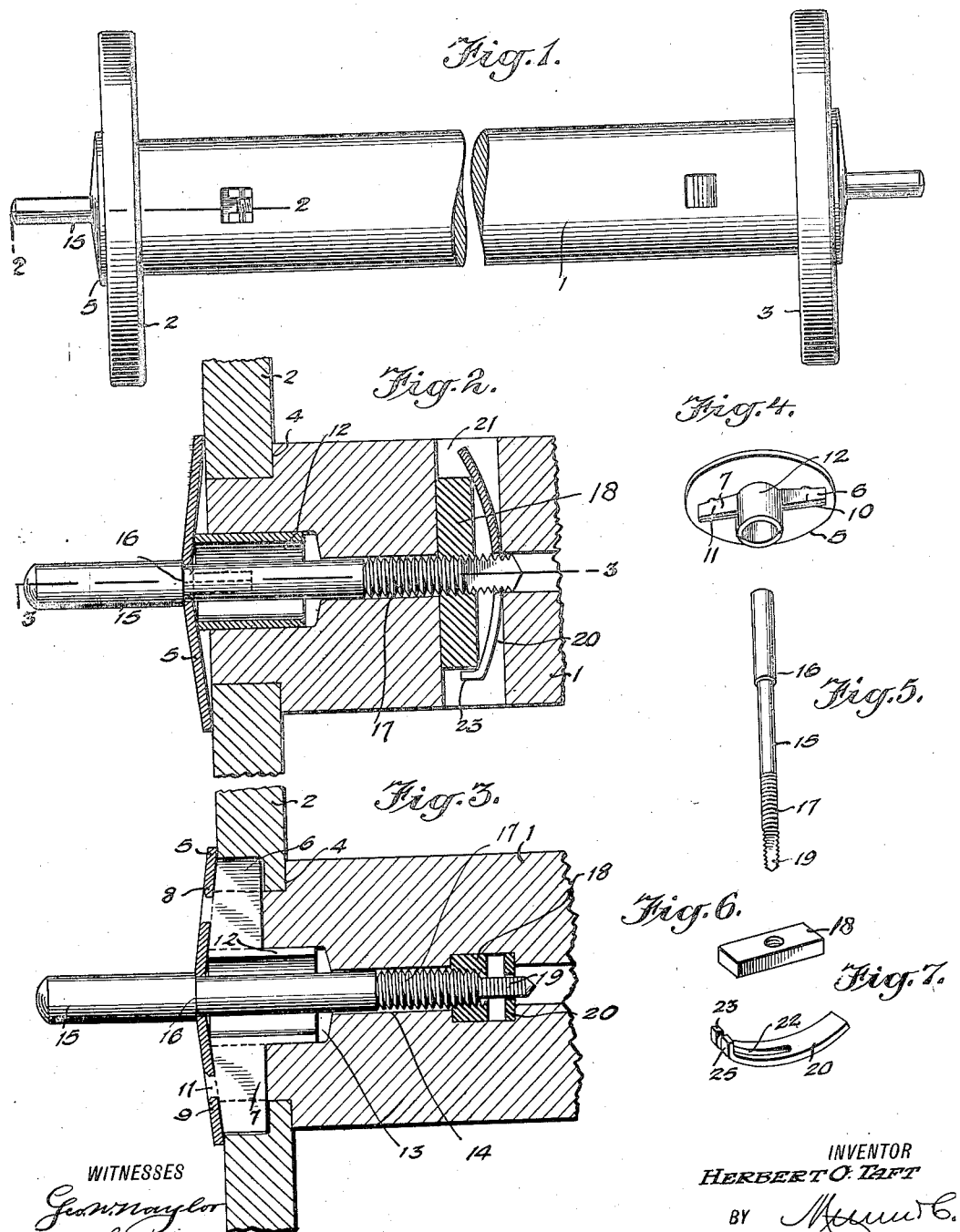

1,490,864

UNITED STATES PATENT OFFICE.

HERBERT OTHRO TAFT, OF BURLINGTON, VERMONT.

JACK SPOOL AND FASTENER THEREFOR.

Application filed May 18, 1923. Serial No. 639,838.

*To all whom it may concern:*

Be it known that I, HERBERT O. TAFT, a citizen of the United States, and a resident of Burlington, in the county of Chittenden and State of Vermont, have invented a new and Improved Jack Spool and Fastener Therefor, of which the following is a full, clear, and exact description.

This invention relates to jack spools and fasteners therefor, and has for an object to provide an improved construction which may be easily applied, and which will not become loose during the operation of the spool.

Another object of the invention is to provide a fastener for the gudgeon of the jack spool, which may be easily applied and locked in place, the construction being such as to cause the locking means to also lock the head of the spool against removal.

In carrying out the objects of the invention a body for the spool is provided of any suitable kind provided with a bore which accommodates a gudgeon and locking means for locking the same in place. In order that the gudgeon may not work loose, a bearing plate is provided for supporting the same near the outer end and this plate in turn is connected with the cylinder through a plurality of webs merging into a supporting sleeve, all of which are locked in place by the same locking means which holds the gudgeon in its locked position. In this way the gudgeon is properly supported in the spool and is locked against independent movement.

In the accompanying drawing—

Figure 1 is a side view of a jack spool with a fastener embodying the invention applied thereto.

Fig. 2 is a sectional view through Figure 1 approximately on the line 2—2.

Fig. 3 is a sectional view through Figure 2 on the line 3—3.

Fig. 4 is a perspective view on a reduced scale of a bearing plate and sleeve embodying certain features of the invention.

Fig. 5 is a perspective view on a reduced scale of the gudgeon shown in Fig. 2.

Fig. 6 is a perspective view on a reduced scale of the nut shown in Fig. 2.

Fig. 7 is a perspective view on a reduced scale of the spring locking member shown in Fig. 2.

Referring to the accompanying drawings by numeral, 1 indicates the body or cylinder of the spool, and 2 and 3 the heads. Both ends of the spool are constructed identically so that the description of one will apply to both. As shown in Figures 2 and 3, the cylinder 1 is provided with an angular notch 4 for receiving the head 2, which head may be fastened in place by glue if desired, but which is locked firmly in place by the bearing plate 5 and the webs 6 and 7. The bearing plate 5 is a very thin disk somewhat cone-shaped and provided with apertures 8 and 9 for receiving the rivets 10 and 11, which rivets are preferably integral projections from the webs 6 and 7. These webs are preferably made in two sections, as shown in Figure 4, and each section merges into half of the supporting sleeve 12. When these sections are both together, as shown in Figure 4, and when the rivets from the various sections are projected through the apertures 8 and 9 and are then upset, the parts are firmly secured together and the plate 5 is also firmly secured to the webs 6 and 7. Suitable nostrils are provided in the end of the cylinder 1 for receiving the webs 6 and 7 and a suitable bore 13 is provided for cylinder 1, while a similar bore 14 is provided for the inner part of the gudgeon 15. This gudgeon is provided with a shoulder 16 bearing against the plate 5 with sectional threads 17 for receiving the nut 18 and a flattened section 19 for receiving the spring lock 20. The nut 18 may be of any desired shape provided it is supplied with a threaded aperture whereby the section 17 may be screwed therein. However, the nut 18 is preferably somewhat elongated to present a better bearing surface than the transverse passageway 21. After the plate 5, webs 6 and 7 and sleeve 12 have been assembled and placed in proper position with respect to the cylinder 1, the gudgeon 15 is inserted and is screwed into the nut 18 until the parts are tight. The spring locking member 20 is then forced into position, as shown in Figure 2, and the spool is ready for use. The spring locking member 20 is a resilient plate formed preferably arc-shaped and provided with a slot 22 accommodating the flat portion 19 of the gudgeon. Turned-down end sections 23 and 24 fit over the end of the nut 18 and thereby prevent the spring from being accidentally removed.

What I claim is:

1. A jack spool comprising a body having a longitudinal bore at one end, a gudgeon extending into said bore, said gudgeon having a threaded section at the edge extending into the bore and also a flattened section at the same edge, a nut fitting into said body adapted to be engaged by the threaded section of the gudgeon, and a spring member formed with an opening straddling said flattened portion of the gudgeon, said spring member being also formed with end portions overlapping the ends of said nut preventing independent rotation thereof.

2. A jack spool comprising a body having a longitudinal bore at one end, a bearing plate fitting against the end of the body, said bearing plate having an opening registering with said bore, a gudgeon forming a shoulder adapted to fit against said bearing plate and part of the gudgeon extends through said aperture and into said bore, said part being formed with a transverse passageway, a nut fitted in said transverse passageway, said gudgeon being formed with threaded sections coacting with said nut, whereby said shoulder is adapted to press said bearing plate firmly in place, said gudgeon being formed with a flat portion near said nut, and an arc-shaped locking spring having a bifurcated section straddling the flattened portion of the gudgeon, said spring being formed with a bent portion at one end fitting against the end of said nut to prevent independent rotary movement of the gudgeon.

3. In a jack spool a body, a gudgeon extending from said body, means for locking the gudgeon in said body, and a bearing structure for the gudgeon, said bearing structure comprising a disk having an aperture through which the gudgeon extends, and a pair of webs merging into a tubular supporting section and a plurality of rivet members extending through the disk for connecting the webs to the disk.

4. A jack spool of the character described comprising a gudgeon and a bearing structure therefor, said bearing structure comprising a disk having an aperture therein and a pair of bracing and supporting members for the disk, each of said bracing and supporting members comprising a pair of oppositely extending webs, a semi-tubular central portion, and a pair of rivets extending through the disk and upset at one end locking the disk to the webs.

5. A jack spool and fastener comprising a body, a disk having an aperture, said body having a bore arranged in line with said aperture, a gudgeon formed with a shoulder, said gudgeon extending through the aperture in said disk so that the shoulder will press against the disk and force the disk against said body, said gudgeon at the inner end being threaded and formed with a flat section, a nut fitted into the body for receiving the threaded end of the gudeon, and a locking member for preventing independent rotation of the gudgeon, said locking member comprising a substantially arc-shaped spring having a slot for receiving said flattened portion, said spring at one end being offset for engaging one end of said nut.

HERBERT OTHRO TAFT.